United States Patent Office 3,632,554
Patented Jan. 4, 1972

3,632,554
PROCESS FOR PREPARING HEAT RESISTING POLYIMIDES
Takashi Kubota, Ohtsu-shi, Japan, assignor to Toray Industries Inc., Tokyo, Japan
No Drawing. Filed May 29, 1968, Ser. No. 732,837
Claims priority, application Japan, May 29, 1967, 42/33,632; Oct. 21, 1967, 42/67,522; Oct. 26, 1967, 42/68,548
Int. Cl. C08g 20/32
U.S. Cl. 260—47 CP     4 Claims

ABSTRACT OF THE DISCLOSURE

A process for preparing heat resisting polyimides which comprises heating an oligoamide-acid composition at a temperature above 200° C. Said oligoamide-acid composition has terminal amino groups and terminal carboxyl groups in a numerical ratio in the range of from about 0.90 to about 1.25, and an inherent viscosity within the range from about 0.05 to about 0.65 and a recurrent structural unit represented by the general formula:

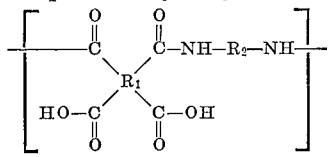

wherein $R_1$ is a tetravalent aromatic radical, and $R_2$ is a divalent aromatic radical. Various specific methods of preparing the oligoamide-acid composition are disclosed in the specification. Typically, the oligonamide acid is prepared by mixing an oligomer (I), which is preferably obtained by the reaction of from about 3–60% mole excess of diamine with tetracarboxylic acid dianhydride in an organic solvent, with an oligomer (II), which is preferably obtained by the reaction of from about 3–60% mol excess of tetracarboxylic acid dianhydride with a diamine, followed by a ring opening reaction of the terminal acid anhydride group of the resulting oligomer with a compound such as water, an alcohol or a thioalcohol. Specific proportions of oligomer (I) to (II) are disclosed in the specification.

If desired, the diamine above may be partially replaced by a triamine, a tetraamine or mixtures thereof. The diamine must still be present in amounts of at least 40 mole percent.

A process for preparing polyimide-shaped articles is also disclosed which comprises coating a substrate with an oligoamide-acid composition, and heating to a temperature above 200° C. Certain very specific properties of the polyimide coated article are recited in the specification.

BACKGROUND OF THE INVENTION

Field of the invention

This invention relates to a process for preparing a heat resisting polyimide, more specifically to a process for preparing a heat resisting polyimide from oligoamide-acid compositions of high concentration and low viscosity.

Description of the prior art

Generally speaking, polyimide is a polymer with excellent heat resisting, mechanical, electrical and chemical properties, but as this polymer does not dissolve in most ordinary organic solvents, and does not melt, this polymer is not suitable for the production of films, an electrically conductive metal wire coated with the polymer "cloth," and adhesives, except in the few cases when the polymer is being shaped directly from a polymer powder.

It is well known that this problem of shaping polyimides into desired articles may be solved by preparing a high molecular weight polyamide acid dissolved in a solvent, shaping the polyamide acid into the desired form from the polyamide acid solution, and then heating the shaped polyamide acid to form the desired polyimide.

Since the mechanical, chemical and electrical properties of the thus formed polyimide articles depend on the molecular weight of the starting polyamide acid, it is necessary to prepare high molecular weight polyamide acids to give a polyimide the desired properties and uses.

In order to obtain high molecular weight polyamide acids, it has been believed, as described in Japanese Pat. No. 286,227, that the starting tetracarboxylic acid dianhydride and diamine must be of high purity, and that said compounds must be reacted under anhydrous conditions with equimolar proportion of the compounds. In fact, Japanese Pat. No. 286,227 discloses that if one of the reactants is used in more than 5% molar excess in the production of the polyamide acid, lower molecular weight polyamide acids would be produced.

When a polyimide film and an electrically conductive metal wire coated with the polyimide are produced from the polyamide acid solution, it is desirable that the concentration of the solution be as high as possible, in order to reduce shrinking due to the evaporation of the solvent. When the solution of polyamide acid is used as a wire coating material, it is necessary to repeatedly coat the wire with the solution in order to give a membrane of the desired thickness on the wire. This makes the coating process very inefficient.

A lower molecular weight polyamide acid has been used to produce a polymer solution of higher concentration, but the polyimide thus obtained is too brittle to use as a film or a coating material for wire. To avoid brittleness when using lower molecular weight polyamide acid, Belgian Pat. No. 663,711 proposes mixing a solution of tetracarboxylic acid dianhydride and a solution of aromatic diamine together to form a polyamide acid solution, and further adding a solid mass of additional tetracarboxylic acid dianhydride and aromatic diamine to said polyamide acid solution to react the solid acid anhydride with diamine in polyamide acid solution.

The process of Belgian Pat. No. 663,711 is very complicated, i.e., the starting materials must be added to an already formed polymer solution, and therefore it takes a long time to complete the reaction. Moreover, the solution so obtained has an undesirably high viscosity, up to several hundred poises.

SUMMARY OF THE INVENTION

The invention basically comprises a process for preparing heat resisting polyimides which exhibit excellent mechanical and electrical properties.

Basically, the polyimides are formed by heating an oligoamide-acid composition at a temperature above 200° C.

It is necessary that the oligoamide-acid composition have terminal amino groups and terminal carboxyl groups. Generally, it has been found that if the ratio of amino to carboxyl groups occurs in the range of from about 0.90 to about 1.25 this is acceptable. It is necessary that the oligoamide-acid composition have an inherent viscosity within the range of from about 0.05 to about 0.65, and have a recurrent structural unit represented by the following formula:

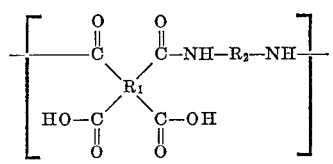

wherein $R_1$ is a tetravalent aromatic radical, and $R_2$ is a divalent aromatic radical. Generally, $R_1$ is a tetravalent aromtaic radical selected from the following group

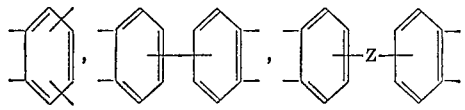

and

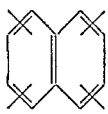

wherein Z is a divalent radical selected from the group consisting of an alkylene radical with from 1 to 3 carbon toms, —O—, —S—, —SO$_2$—, —CO—, and —CONR'—, wherein R' is a monovalent radical selected from the group consisting of a hydrogen atom, an alkyl radical with from 1 to 3 carbon atoms and a phenyl radical, and $R_2$ is a divalent radical selected from the group consisting of

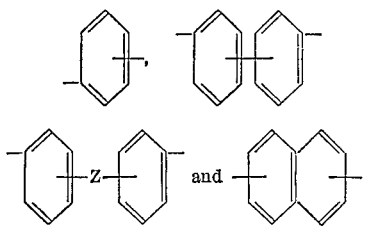

wherein Z is as described above.

The amide acid oligomer may be obtained by the reaction of an aromatic tetracarboxylic dianhydride represented by the following general formula:

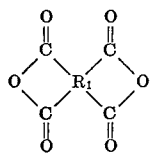

$R_1$ is as described above. This aromatic dianhydride may be reacted with an aromatic diamine represented by the following general formula:

$$H_2N—R_2—NH_2$$

$R_2$ is a divalent aromatic radical selected from the group consisting of

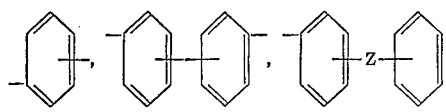

and

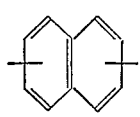

The aromatic diamine must be present in an amount greater than 40 mole percent of the aromatic tetracarboxylic acid dianhydride.

If desired, the aromatic diamine may be partially replaced by an aromatic triamine, an aromatic tetraamine or mixtures thereof.

The aromatic triamines and tetraamines may be represented by the following formulas, respectively:

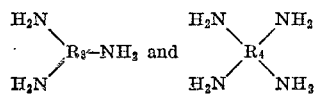

$R_3$ is generally selected from the group consisting of:

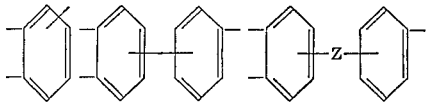

and

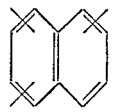

$R_4$ is generally selected from the group consisting of:

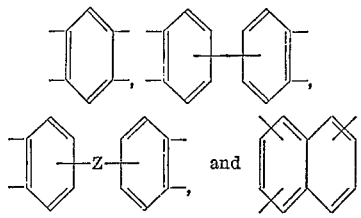

Z is as described above.

If the triamine, tetraamine or mixtures thereof replaces any of the diamine, this replacement must occur in an amount less than 60 mole percent of the aromatic tetracarboxylic acid dianhydride.

Typically, the oligoamide-acid composition is prepared by mixing a first oligomer [oligomer (I)], which may be obtained by the reaction of from about 3–60% mole excess of diamine with tetracarboxylic acid dianhydride in an organic solvent, with an oligomer [oligomer (II)], which is obttained by the reaction of from about 3–60% mole excess of tetracarboxylic acid dianhydride with diamine. This reaction is followed by a ring opening reaction which is performed by reacting the terminal acid anhydride group of the resulting oligomer (II) with a compound from the class consisting of water, alcohols and thioalcohols.

In the formula above, $m_1$ is the mol number difference of the amine component and tetracarboxylic acid component contained in a unit weight of oligomer (I), and $m_2$ is the mol number difference of the amine component and the tetracarboxylic acid component contained in a unit weight of oligomer (II). W represents the weight ratio of oligomer (I) to oligomer (II) mixed therewith.

The proportions of oligomer (I) to oligomer (II) may be determined by the following formula:

$$m_1/1.25m_2 \leq W \leq m_1/0.9m_2$$

If desired, the diamine used for the preparation of oligomer (I) may be partially replaced (in an amount of from about 5 to about 6 mole percent of the diamine) with a triamine, tetraamine or mixture thereof. Said triamine is illustratively shown by the following class of compounds:

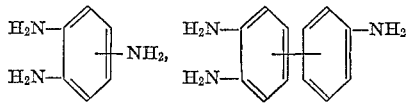

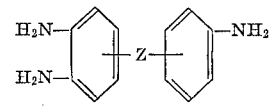

and

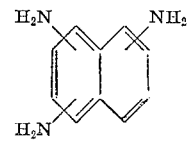

The tetraamine utilized may be illustratively shown by the following class of compounds:

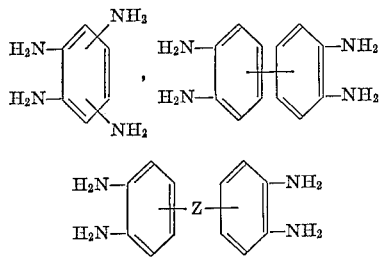

and

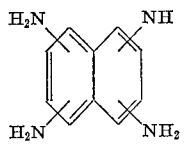

Z and R' are as described above.

A process for preparing heat resistant polyimide-shaped articles is also described. This process basically comprises coating an oligoamide-acid composition onto a substrate, and then heating the coated substrate at a temperature above 200° C.

The oligoamide-acid composition may be obtained by the processes described above. It is found that the composition results in an excellent insulative coating for metal wires.

While practicing the above process, it has been found that shaped polyimide articles can be more easily produced than by any method known to the prior art. This was, of course, one of the prime objects of the invention.

In addition, the polyimide produced in accordance with the present invention has excellent heat resisting, chemical and electrical properties.

DESCRIPTION OF THE PREFERRED EMBODIMENTS

The objects of this invention may be accomplished by heating an oligoamide-acid composition obtained by the reaction of tetracarboxylic acid dianhydride with diamine in an organic solvent, in order to polymerize said composition and to perform the ring closure reaction of said composition, said oligoamide-acid composition having terminal amino groups and terminal carboxyl groups in a molar ratio of terminal amino groups to terminal carboxyl groups of from 0.9 to 1.25, preferably from 0.95 to 1.15, and having an inherent viscosity of from 0.05 to 0.65, preferably from 0.15 to 0.65.

The term "oligoamide-acid composition" is employed to designate a mixture basically composed of two of oligomers having a recurring unit represented by the following general formula:

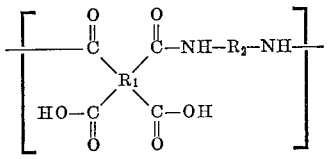

(Definitions of $R_1$ and $R_2$ will be given in the following explanation.) One of the oligomers is terminated at both terminals of the molecule with amino groups, and the other oligomer is terminated at both terminals of the molecule with carboxyl groups.

Into said oligoamide-acid composition, an oligomer terminated with an amino group of one of its terminals, and terminated with a carboxyl group at the other terminal, may be incorporated.

The terms "terminal amino group" or "terminal carboxy group" mean that only one amino or carboxyl group is connected with the terminal benzene ring of the oligomer composition. Therefore, an amino group or a carboxyl group connected with the terminal benzene ring which is other than the amino group or carboxyl group considered as the terminal group in the neighbouring positions on the benzene ring, is not defined as a terminal group. An amino or a carboxyl group neighbouring the amide linkage is also not defined as a terminal amino or carboxyl group.

The inherent viscosity [$\eta_{inh}$] used in this specification is defined by the following formula:

$$\text{Inherent viscosity} = \frac{\text{natural logarithm} \frac{\text{flow time of solution}}{\text{flow time of solvent}}}{\text{concentration}}$$

and is determined by using an Uhbelohde viscometer. "Concentration" in the above formula is the concentration of oligomer or polymer in solution, expressed in gram numbers of oligomer or polymer per 100 ml. of solution. Generally, the viscosity is determined at 30° C., with an oligomer concentration of 0.5 g./100 ml. As a solvent for the oligomer, dimethyl acetamide is used. The inherent viscosity of the polyimide is determined in fuming nitric acid at 30° C. with a polymer concentration of 0.5 g./100 ml.

The viscosity of solution is determined using a Brookfield viscometer, and is expresesd in poise (° C.).

The tetracarboxylic acid dianhydride used in this invention may be represented by the following general formula:

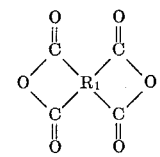

wherein $R_1$ is a tetravalent aromatic radical.

Illustrative $R_1$ radicals of said tetracarboxylic acid dianhydride are:

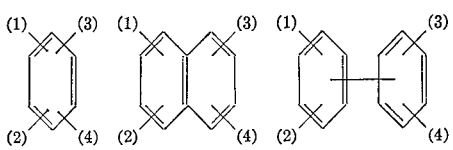

and

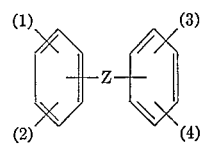

wherein bond (1) and (2) are located on the aromatic ring in an o-position or peri-position to each other; bond (3) and bond (4) are the same as bond (1) and bond (2); Z is either an alkyl group having from 1 to 3 carbon atoms, —O—, —S—, —SO$_2$—, —CO—, or CONR'—; and R' is hydrogen, an alkyl group having from 1 to 4 carbon atoms or a phenyl group.

Examples of preferred tetracarboxylic acid dianhydrides used as one of the starting compounds are: pyromellitic dianhydride; 2,3,6,7-naphthalene tetracarboxylic acid dianhydride; 1,2,4,5-naphthalene tetracarboxylic acid dianhydride; 1,4,5,8-naphthalene tetracarboxylic acid dianhydride; 3,3',4,4'-diphenyl tetracarboxylic acid dianhydride; 1,2,5,6-naphthalene tetracarboxylic acid dianhydride; 2,2',3,3'-diphenyl tetracarboxylic acid dianhydride; 2,2-bis(3,4-dicarboxyphenyl) propane dianhydride; bis(3,4-dicarboxyphenyl) sulfone dianhydride; 3,4,9,10-perillene tetracarboxylic acid dianhydride; bis(3,4 - dicarboxy phenyl) ether dianhydride; 2,4 - dichloro naphthalene-1,4,5,8-tetracarboxylic acid dianhydride; 2,2-bis(2,3-dicarboxyphenyl) propane dianhydride; bis(2,3-dicarboxyphenyl) methane dianhydride; bis(3,4-dicarboxy phenyl) sulfone dianhydride; 3 - methylbenzene - 1,2,4,5 - tetracarboxylic acid dianhydride; 3,4,3',4'-benzophenone tetracarboxylic acid dianhydride; and a mixture of two or more of said dianhydrides.

The diamines used as another starting compound in the process of this invention may be represented by the following general formula:

$$H_2N\text{—}R_2\text{—}NH_2$$

wherein $R_2$ is a divalent radical having at least 6 carbon atoms of benzenoid nature.

Illustrative $R_2$ radicals of said diamine are:

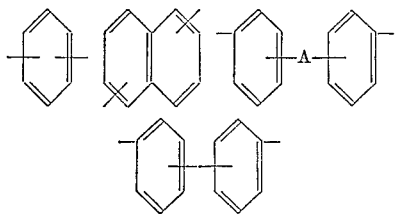

wherein A may be selected from an alkylene radical having from 1 to 3 carbon atoms, —O—, —S—, —SO$_2$—, —SO$_3$—, —CO—, —CONR'—,

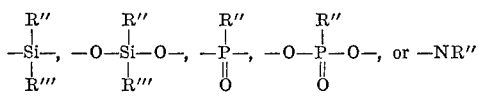

R' is hydrogen, an alkyl group having from 1 to 4 carbon atoms or phenyl; and R'' and R''' may be an alkyl group having from 1 to 4 carbon atoms or a phenyl group.

Examples of preferred diamines used are: meta-phenylene diamine; para-phenylene diamine; 4,4'-diamino-diphenyl methane; benzidine; 4,4'-diamino-diphenyl sulfide; 4,4' - diamino - diphenyl sulfone; 3,3' - diamino - diphenyl sulfone; 4,4' - diamino - diphenyl ether; 2,6 - diaminopyridine; bis(4 - amino - phenyl)diethyl silane; bis(4-amino-phenyl) diphenyl silane; bis(4 - amino - phenyl)-N-methyl amine; 1,5 - diamino naphthalene; 3,3'-diethyl-4,4' - diamino - biphenyl; 3,3' - dimethoxy benzidine; 2,4 - bis(beta-amino - t - butyl) toluene; bis(p-beta-amino-t-butyl phenyl) ether; 3,3' - dichloro - benzidine; bis(4 - amino - phenyl) ethyl phosphine oxide; bis(4-amino-phenyl) phenyl phosphine oxide; bis-(4-aminophenyl)-N-phenyl amine; and a mixture of two or more of said diamines.

The oligoamide-acid composition used in the process of this invention may be prepared from said tetracarboxylic acid dianhydride and diamine in a manner as described hereinafter. For example, the oligoamide-acid composition of this invention is prepared by mixing an oligomer (I) obtained by the reaction of from 3–60% mole excess of diamine with tetracarboxylic acid dianhydride in an organic solvent, and an oligomer (II) obtained by the reaction of from 3–60% mole excess of tetracarboxylic acid dianhydride with diamine, followed by the ring opening reaction of the terminal acid anhydride group with a compound selected from the class consisting of water, alcohols and thialcohols, in a proportion determined by the following formula:

$$m_1/1.25m_2 \leqq W \leqq m_1/0.9m_2$$

wherein $m_1$ is the mol number difference of the amine component and the tetracarboxylic acid component contained in a unit weight of oligomer (I), and $m_2$ is the mol number difference of the amine component and the tetracarboxylic acid component contained in a unit weight of oligomer (II), and wherein W represents the weight ratio of oligomer (I) to oligomer (II) mixed therewith.

The reaction temperature used in the preparation of oligomer (I) and (II) is usually below 175° C., and is preferably below 100° C., but above the melting temperature of the organic solvent used.

As described, the oligomer (I) is prepared from excess diamine and insufficient tetracarboxylic acid dianhydride so that the oligomer (I) has the characteristic feature of a relatively lower degree of polymerization, and the oligomer generally has a $\eta_{inh}$ value of less than 0.65, most of the terminal groups being terminated with an amino group.

On the other hand, as oligomer (II) is prepared from excess tetracarboxylic acid dianhydride and insufficient diamine, and the terminal anhydride group of the oligomer so produced is opened with water, alcohol or thialcohol, the oligomer (II) is characterized by its relatively low degree of polymerization, and therefore the oligomer produced has a $\eta_{inh}$ less than 0.65 and is characterized by most of terminal groups of the oligomer being carboxylic acid or a carboxylic acid derivative.

As described, the terminal carboxylic anhydride groups of the oligomer must be opened with water, alcohol or thioalcohol. If they are not treated with water, alcohol or thioalcohol, oligoamide-acid with most terminal groups being acid anhydride groups would be formed, and when the acid anhydride terminated oligomer is mixed with the amino terminated oligomer of oligomer (I) type, the terminal amino group and anhydride group would react to form a high molecular weight polyamide-acid which has a viscosity in an organic solvent and is very difficult to handle. This is the reason that oligomer (II) must be reacted with water, alcohol or thioalcohol.

The ring opening reaction of the terminal acid anhydride group may be accomplished by mixing said compounds with the oligoamide-acid. There is no time limitation for the addition of the compounds, and the compounds may be added to the oligomer either during the time of reaction or after reaction. Sometimes these compounds may be incorporated into the starting diamine before reaction.

The alcohols used may be both lower alcohol and higher alcohol, as long as the alcohol is an aliphatic monohydric alcohol.

Examples of alcohols used are: methanol, ethanol, propanol, butanol, pentanol, hexanol, octanol, octadecanol, ethylene glycol monomethyl ether, ethylene glycol monobutyl ether, methoxybutanol, diethylene glycol monoethyl ether, glycerine dimethyl ether, beta-dimethyl amino ethanol, benzyl alcohol, phenethyl alcohol, methoxy carbonyl propanol, carboxy ethanol, cyclohexanol and isomers thereof.

The thioalcohols used may be lower and higher thioalcohols, so long as the thioalcohol is an aliphatic monothioalcohol.

Examples of thioalcohols used are: ethyl mercaptane, propyl mercaptane, butyl mercaptane, beta-diethyl ethyl mercaptane, and isomers thereof.

The water, alcohols or thioalcohols, may be called "compounds having one active hydrogen atom," and may be used in an amount sufficient to open the terminal acid anhydride of the oligoamido acid. Generally, they are used in excess amounts, such as from 50–40% by mole excess of the terminal acid anhydride of the oligomer.

In the step of the production of the oligomer (I) of the process of this invention, a part of, or the whole of, the diamine used may be replaced with a triamine or a tetraamine, or with a mixture of two or more of said triamines or tetramines.

In the past, it has been considered that it is undesirable to use large amounts of the triamine as the starting compound for the production of a linear polycondensate, since the triamine or tetramine has 1 or 2 excess amino groups other than the amino groups necessary to form the linear polycondensate with a tetracarboxylic acid dianhydride. It was felt that the presence of said excess amino groups would result in gel formation during the reaction, and make it difficult to give a solvent soluble intermediate for the production of a polyimide of sufficient molecular weight to be used as a heat-resisting polymer.

In accordance with the process of this invention, since the oligomer (I) is produced by reacting excess amine compound with tetracarboxylic acid dianhydride, there is almost no trouble with gel formation.

Generally, it is known that when trifunctional or tetrafunctional compounds are used as one of the starting compounds of the polymer, the polymer so formed has excellent mechanical properties, such as good dimensional stability, high elasticity and resistance to abrasion. Therefore, when triamine and tetramine are used in the present invention the polymer produced would be expected to display these properties.

The triamine and tetramine are respectively represented by the following general formulas:

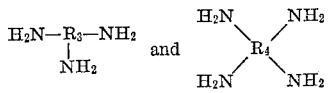

wherein $R_3$ and $R_4$ are, respectively, tri- and tetra-valent aromatic radicals. The aromatic ring may further be substituted by one or more "inert" substituents which are non-reactive to an amino group, carboxylic anhydride group and carboxylic group under reaction condition. "Inert" substituents may be hydroxy, alkoxy, cycloalkyl, aryl, alkoxy, cycloalkoxy, aryloxy group and halogen atoms. In some cases, the inert substituents may improve the desired properties of the polymer, such as adhesive property and the like.

Illustrative of the preferred $R_3$ and $R_4$ groups of the triamine and tetramine are:

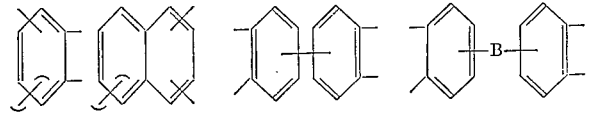

wherein B is alkylene radical having from 1 to 3 carbon atoms, —O—, —S—, —SO$_2$—, —CO—, —CONR'—,

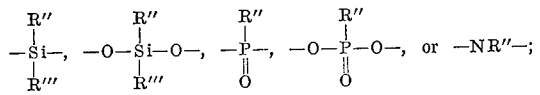

R' is hydrogen, an alkyl radical having from 1 to 4 carbon atoms or a phenyl radical; R" and R'" each is an alkyl having 1 to 4 carbon atoms or phenyl, and (—) represents a covalent bond in the case of tetramine.

Examples of preferred triamines used are:

3,4,4'-triaminodiphenyl ether;
3,4,4'-triaminodiphenyl methane;
3,4,4'-triaminodiphenyl propane;
1,2,4-triaminobenzene;
2,4,5-triaminotoluene;
2,4,5-triaminoanisole;
3,4,4'-triaminodiphenyl sulfone;
5-amino dianisidine;
3,3'-dichloro-5-aminobenzidine;
3,3'-dimethyl-5-aminobenzidine;
3,4,4'-triamino diphenyl sulfone;
3,4,4'-triamino diphenyl-N-methylamine;
3,4,4'-triamino-diphenyl diethyl silane;
3,4,4'-triaminobenzanilide;
2,3,6-triamino pyridine;
1,2,5-triamino naphthalene;
2-(3',4'-diamino phenyl)-5-aminobenzoxazole;
2,3,7-triaminoacridine;

and a mixture of two or more of said triamines.

Examples of preferred tetramines used are:
3,4,3',4'-tetraaminodiphenyl ether;
3,4,3',4',-tetraaminodiphenylmethane;
3,4,3',4',-tetraaminodiphenylpropane;
1,2,4,5-tetraaminobenzene;
3,4,3',4',-tetraaminodiphenyl sulfone;
3,3'-diaminobenzidine;
5,5'-diaminodianisidine;
3,3'-dichloro-diaminobenzidine;
3,3'-dimethyl-5,5'-diaminobenzidine;
3,4,3',4'-tetraamino-diphenyl-sulfide;
3,4,3',4'-tetraaminodiphenyl-N-methylamine;
3,4,3',4'-tetraamino diphenyldiethyl silane;
3,4,3',4'-tetraaminobenzanilide;
2,3,5,6-tetraaminopyridine;
1,2,5,6-tetraaminonaphthalene;
1,4,5,6-tetraaminonaphthalene;

and a mixture of two or more of said tetraamines.

Triamines and tetramines may be mixed and used in the form of a mixture.

In the production of the oligomer (I), the diamine used may be replaced by said triamine or tetramine either in part or wholly, but it is preferred to use the triamine or tetramine in an amount less than 60 mole percent of total amine needed to give the desired polymer.

As reaction solvents used in the production of oligomer (I) and oligomer (II), those solvents which dissolve the product oligomers, are preferred.

Examples of those solvents are: N,N-dialkyl carboxylic acid amides, such as N,N-dimethyl formamide, N,N-diethyl formamide, N,N-dimethyl acetamide, N,N-dimethyl acetamide, N-methyl-2-pyrrolidone, N-methyl-caprolactam and the like. Further, dimethyl sulfoxide, tetramethyl urea, hexamethyl phosphoramide, tetramethylene sulfone, formamide, gamma-butyrolactone, pyridine, acetone, and tetra-hydrofurane may be used as solvents.

The following may be incorporated into said reaction solvent if desired: benzene; toluene; benzonitrile; xylene; solvent naphtha; dioxane; phenols, such as phenol and cresol; and alcohols, such as methanol, ethanol, isopropanol, and methyl Cellosolve.

The solvent used in the polymerization reaction need not always be in the anhydrous state, since sometimes the polymerization may be conducted with added water.

Said solvent may be used in an amount sufficient to make the reaction product agitatable. As stated above, the oligomer (I) and (II) formed by the reaction of this process have a relatively low viscosity, so that the amount of solvent used is able to adequately reduce the viscosity in comparison with known processes. The reaction may be conducted at very diluted reaction conditions, but this is not economical. Generally speaking, the solvent may be used in amounts of from 0.05% to about 50% by weight of reaction product.

The reaction for preparing oligomer (I) and oligomer (II), is conducted, as stated above, at a temperature below 175° C., preferably below 100° C., and above the solidification temperature of the solvent used. Said reaction may be conducted in various ways, such as: (a) dissolving a diamine in a solvent to form a solution, and then adding to the solution a tetracarboxylic acid dianhydride in either solid form or dissolved form; (b) dissolving a tetracarboxylic acid dianhydrided in a solvent to form a solution, and then adding to the solution a diamine in either solid form or powdered form; and (c) adding to a solvent a mixture of diamine and tetracarboxylic acid dianhydride, and the like. In order to obtain a lower molecular weight polymer, it is preferred to conduct the reaction by adding a solution of tetracarboxylic acid dianhydride to a solution of diamine.

The oligoamide-acid composition, wherein the mole ratio of the terminal amino group to the terminal carboxylic acid group (—MH$_2$/—COOH) is in the range of from 0.9 to 1.25, and the inherent viscosity is in the range of from 0.05 to 0.65, used to accomplish the object of this invention, may be prepared by mixing oligomer (I) and oligomer (II) in a definite mixing ratio.

Said mixing ratio of oligomer (I) and oligomer (II) may be determined by the following formula:

$$m_1/1.25m_2 \leqq W \leqq m_1/0.9m_2$$

wherein $m_1$ is the mol number difference of the amine component and the tetracarboxylic acid component contained in a unit weight of oligomer (I), and $m_2$ is the mol number difference of the amine component and the tetracarboxylic acid component contained in a unit weight of oligomer (II), and wherein W represents the weight ratio of oligomer (I) to oligomer (II) mixed therewith.

The oligoamide-acid composition used for the production of the polyimide of this invention is easily obtained by mixing the oligomer (I) and the oligomer (II) in a ratio as defined in the formula above.

The object of this invention may be accomplished by heating the described oligamide-acid composition. Heating temperatures for the production of polyimides is generally in the range of from 200° C. to 500° C., and preferably from about 250° C. to 450° C.

If desired, before heating the oligomer composition to produce polyimide, a small amount of the heretofore described diamine, triamine, tetramine and tetracarboxylic acid (or its ester derived from tetracarboxylic acid dianhydride) may be incorporated into the amide acid oligomer composition to improve the properties of the polyimide to be produced. But one must keep in mind that the ratio of terminal amino groups to terminal carboxylic groups in the whole oligomer composition must be within the range of from 0.9 to 1.25 when said additives are incorporated into the oligomer composition. The amount of said additives is preferred to be less than 10% by weight of the oligoamide-acid composition.

Further, in accordance with this invention, a small amount or aliphatic diamine such as bis(p-amino-cyclohexyl)methane, hexamethylene diamine, heptamethylene diamine, octamethylene diamine, nonamethylene diamine, decamethylene diamine, 3-methyl heptamethylene diamine, 4,4-didiethyl heptamethylene diamine, 2,11-diamino-dodecane, 1,2-bis(3-aminopropoxy)ethane, 2,2-dimethyl propylene diamine, 3-methoxyhexamethylene diamine, 2,5-dimethylhexamethylene diamine, 2,5-dimethyl heptamethylene diamine, 5-methyl nona-methylene diamine, 1,4 - diamino-cyclohexane, 1,12-diamino-octadecane, 2,5-diamino-1,2,4-oxadiazole,

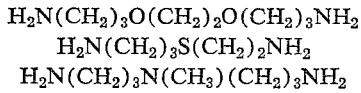

piperazine, and N,N'-dimethyl ethylene diamine; aliphatic triamine such as 1,2,6-triamino-hexane, 1,2,12-triaminododecane, 1,2,6-triamino-3,4-dimethyl-hexane, 1,2,12-triamino octadecane, 1,3,4-triamino-cyclohexane, 3,4,4'-triamino-dicyclohexyl methane, and 1,2,6-triamino-4-methoxyhexane; and aliphatic tetramine such as 1,2,5,6-tetra-aminohexane and 1,2,4,5-tetra-aminocyclohexane; and aliphatic tetracarboxylic acid dianhydride, such as ethylene tetracarboxylic acid dianhydride, decahydronaphthalene-1,4,5,8-tetracarboxylic acid dianhydride, cyclopentane-1,2,3,4-tetracarboxylic acid dianhydride, pyrolidine-2,3,4,5-tetracarboxylic acid dianhydride and the like may be copolymerized with the polyimide without departing from the scope of this invention.

Into said oligoamide-acid composition, viscosity stabilizers, such as formic acid, monochloroacetic acid, para-aminophenol, and the like, may be incorporated before heating.

Further, into said oligoamide-acid composition, known ring closure and polymerization reaction accelerators such as a tertiary amine which is a Lewis base reaction product may be incorporated. Examples of ring closure reaction accelerators used are: pyridine, 3,4-lutidine, 3,5-lutidine, 4-methylpyridine, 3-methylpyridine, 4-isopropylpyridine, N,N-dimethylaniline, quinoline, isoquinoline, 4-benzylpyridine, trimethylamine, and N,N-dimethylbenzylamine. Said accelerators may be incorporated into the oligomer composition in an amount of from 0.1 to 6.2% by weight of the oligomer composition.

Into said oligoamide-acid composition, various kinds of fillers may also be incorporated before heating too. Examples of fillers used are: glass fiber, asbestos; carbonized fiber, such as cellulose, polyacrylonitrile, polyethylenechloride fiber and the like. The amount of fillers to be incorporated into the oligomer composition may be determined by considering the purpose of desired polyimide.

Therefore, in accordance with this invention, a high molecular weight polyimide or a polyimide-imidazopyrrolone (when a triamine or tetramine is used as a part of the amine compound) of excellent heat resisting, mechanical, chemical and electrical properties, is obtained upon heating the oligoamide-acid composition, resulting in intro-molecular imide ring formation or both imido ring and imidazopyrrolone ring formation, and in the polycondensation reaction of the composition, forming a polymer of a high degree of polymerization. These facts are not known in conventional processes for the production of polyimide resin.

Another characteristic feature of this invention is the fact that the oligoamide-acid composition has extremely low viscosity, and the composition is able to be used at high concentrations. Therefore, from said oligomer composition, one can efficiently obtain shaped articles of polyimide.

As the oligoamide-acid composition of this invention is of low viscosity, one is able to use a solution of it which is of high concentration, and thus the composition is well suited for use as a coating material in the production of polyimide coated insulated electric cable, and as an adhesive composition which produces excellent coated films of good adhesion having good dimensioned stability. Further, said composition may be utilized as a raw material for the production of film, impregnation varnishes and also for prepreg and laminated boards.

It is known that the mole ratio of the terminal carboxylic acid to the terminal amino group can be determined by a simple calculation from the mole ratio of starting tetracarboxylic dianhydride and diamine used for the production of the oligomer if the purities of the starting compounds are known. In this calculation, the water content of the solvent used for dissolving tetracarboxylic acid dianhydride must be considered, since the water present reacts with the dianhydride to form a monoanhydride.

The mole ratio of terminal amino groups to carboxylic acid groups is determined directly by means of suitable analytical methods including NMR, IR, potentiometric titration and the like.

The following examples will illustrate preferred embodiments of this invention. In the tables of the examples, the following abbreviations are used:

AMINES 2-mP: m-phenylene diamine,
2-mP: p-phenylene diamine,
2-B: benzidine,
2-MB: 3,3'-dimethoxy benzidine,
2-DE: 4,4'-diamino-diphenyl ether,
2-DTE: 4,4'-diamino-diphenyl thioether,
2-DM: 4,4'-diamino-diphenyl methane,
2-BPP: 2,2-bis(4-aminophenyl)propane,
2-BPES: bis(4-aminophenyl)diethyl silane,
2-PMA: 4,4-diaminophenyl N-methyl amine,
2-N: 2,6-diamino naphthalene,
3-DE: 3,4,4'-triamino-diphenyl ether,
3-DM: 3,4,4'-triamino-diphenyl methane,
3-P: 1,2,4-triamine benzene,
3-B: 3,4,4'-triamino-diphenyl,
3-BPA: 3,4-diamino-benz-p-amino anilide,
4-DE: 3,4,3',4'-tetra-amino-diphenyl ether,
4-P: 1,2,4,5-tetraamino benzene,
4-DM: 3,4,3',4'-tetra-amino-diphenyl methane,
4-N: 1,2,5,6-tetra-amino naphthalene,
4-DS: 3,4,3',4'-tetra-amino-diphenyl sulfone.

TETRACARBOXYLIC ACID DIANHYDRIDES

DPTDA: 3,4,3',4'-diphenyl tetracarboxylic dianhydride,
PMDA: pyromellitic dianhydride,
PPDA: 2,2-bis(3,4-dicarboxyphenyl)propane dianhydride,
BTAD: benzophenone tetracarboxylic acid dianhydride,
BDPEDA: bis(3,4-dicarboxy phenyl) ether dianhydride,
$PSO_2DA$: bis(3,4-dicarboxy phenyl) sulfone dianhydride.
BUTC: butane tetracarboxylic acid dianhydride,
NTDA: 1,2,5,6-naphthalene tetra carboxylic dianhydride,

SOLVENTS

DMF: N,N-dimethyl formamide,
DEF: N,N-diethyl formamide,
DMAC: N,N-dimethyl acetamide,
NMP: N-methyl pyrrolidone,
DMSO: dimethyl sulfoxide,
HMPA: N,N',N''-hexamethyl phosphoamide,
THF: tetrahydrofuran,
CHCO: cyclohexanone,
SN: solvent naphtha.

ACTIVE HYDROGEN COMPOUNDS

EtOH: ethanol,
DEG: Diethylene glycol monomethyl ether,
ODA: octadecanol,
PA: phenethyl alcohol,
CHA: cyclohexanol,
β-DMEA: β-dimethyl amino ethanol.
BS: butyl mercaptane.

EXAMPLE 1

(1) Preparation of oligomer (I)

Into a 300-ml. three-necked flask, 14.02 g. of 4,4'-diamino-diphenyl ether and 101.2 g. of N,N-dimethyl acetamide are charged and the diaminodiphenyl ether is dissolved in the dimethyl acetamide. Into the solution so formed, 11.76 g. of pyromellitic dianhydride dissolved in 105.8 g. of N,N-dimethyl acetamide at 50° C., is added over a period of 10 seconds. Then the vessel used for the preparation of pyromellitic dianhydride solution is washed with 25 g. of the solvent, and the wash liquid is incorporated into the reaction mixture. The reaction is continued for 2 hours at 15°–20° C. A 10% solution of the product so formed has a solution viscosity of 0.08 poise (at 20° C.), and the inherent viscosity of the oligoamide-acid diluted with dimethylacetamide is 0.16.

The product solution is spread onto a glass plate, dried at 100° C. for 25 minutes with air, and then heated at 300° C. for 30 minutes. No polyfilm is obtained. The oligoimide so produced has an inherent viscosity of 0.18, determined in fuming nitric acid.

(2) Preparation of oligomer (II)

Into a 300-ml. three-necked flask, 15.27 g. of pyromellitic dianhydride and 137 g. of dimethyl acetamide are charged, and the mixture is heated at 60° C. to dissolve the pyromellitic dianhydride in the solvent. Into the solution so formed, 11.21 g. of 4,4'-diaminodiphenyl ether dissolved in 75.9 g. of dimethyl acetamide is added with stirring at a temperature of from 30° to 42° C. The vessel used for the preparation of the diamine solution is washed with 25 g. of the solvent, and the wash liquid is incorporated into said reaction mixture. The reaction is conducted at 15°–20° C. for 2 hours, and into the reaction mixture is added 3 g. of water.

The solution formed has a solution viscosity of 0.095 poise (at 20° C.), and an inherent viscosity of 0.20. The solution is heated in the same manner as in the case of oligomer (I) described above, but no film is obtained. The powder state oligoimide so formed has an inherent viscosity of 0.19.

(3) Oligoamide-acid composition (mixture)

200 ml. of each of oligomer (I) solution and oligomer (II) solution thus formed are mixed together at 15°–20° C. The resulting composition has a solution viscosity of 0.11 poise (at 20° C.), and an inherent viscosity of 0.22. The mole ratio of terminal amino groups to terminal carboxyl groups of the composition is 1.11.

The resulting composition is spread on a glass plate, dried at 100° C. for 15 minutes, and heated at 300° C. for 30 minutes. There is obtained a film of excellent flexibility having an inherent viscosity of 0.83. The film has a tensile strength of 10 kg./mm.$^2$ and will elongate 25%.

EXAMPLE 2

(1) Preparation of oligomer (II)

The procedure of Example 1 for the preparation of oligomer (II) is repeated, but 5 g. of methanol are used instead of water. Oligomer (II) having a viscosity of 0.09 poise (at 20° C.), and an inherent viscosity of 0.21 is obtained.

(2) Oligoamide-acid composition (mixture)

200 ml. each of the oligomer (I) solution obtained in Example 1, and the oligomer (II) solution obtained as above are mixed together at 15°–20° C. The resulting composition has a solution viscosity of 0.1 poise (at 20° C.) and an inherent viscosity of 0.23. The molar ratio of terminal amino groups to terminal carboxyl groups of the composition is 1.02.

The resulting composition is spread on a glass plate, dried at 100° C. for 15 minutes, and heated at 300° C. for 30 minutes to obtain a polyimide film of excellent flexibility. The properties of the film are the same as the film obtained in Example 1.

EXAMPLE 3

(1) Preparation of oligomer (I)

227.897 g. of pyromellitic dianhydride, containing 0.92 mole percent of pyromellitic monoanhydride as an impurity, is dissolved in 1872.8 g. of dimethyl acetamide containing 287 p.p.m. of water. Into this solution 240.293 g. of 100% pure 4,4'-diaminodiphenyl ether is added at a temperature of 30° C. with stirring. After 2 hours, oligomer solution having a viscosity of 0.32 poise (at 20° C.) and an inherent viscosity of 0.22 is obtained. The terminal amino group of the thus obtained oligomer is analyzed by NMR, and the terminal carboxyl group of the oligomer is analyzed by the potentiometric titration method using 0.1 M of benzyl amine as a titration reagent. The results obtained show that the molar ratio of terminal amino group terminals to carboxyl groups of oligomer (I) to be 9.37.

(2) Preparation of oligomer (II)

Oligomer (II) is prepared from the same diamine, tetracarboxylic dianhydride and solvent used for the preparation of oligomer (I) above. Thus, 170.207 g. of 4,4'-diamino diphenyl ether is dissolved in 1554.0 g. of dimethyl acetamide, and into the solution 218.292 g. of pyromellitic dianhydride is added. The resulting mixture is stirred at room temperature for 2 hours to give an oligomer solution having an inherent viscosity of 0.23. No terminal amino group may be detected in this oligomer.

(3) Oligomer mixture

The oligomer (I) solution and the oligomer (II) solution are mixed in a ratio of 1.2:1 to form an oligomer composition. The oligomer composition formed has a solution viscosity of 0.35 poise (at 20° C.) and an inherent viscosity of 0.23, and the molar ratio of terminal amino groups to terminal carboxyl groups of the composition is 1.04.

The composition is spread on a glass plate, dried at 100° C. for 20 minutes, heated in an oven at 200° C.

at a heating rate of 5° C./min. up to 200° C., and then heated at 350° C. for 10 minutes. The polyimide is obtained in the form of a tough transparent film which is yellow in color. The polyimide has an inherent viscosity of 1.23 (0.5% conc., 30° C., in fuming $HNO_3$).

EXAMPLE 4

(1) Preparation of oligomer (I)

A 4,4'-diamino-diphenyl ether solution (10% concentration) is reacted with a pyromellitic dianhydride solution in a molar ratio of 4,4'-di-amino diphenyl ether/pyromellitic dianhydride of 100/50, in the manner described in Example 1, to form oligomer (I) having a solution viscosity of 0.05 poise (at 20° C.), and an inherent viscosity of 0.07.

The reaction product thus formed is dried on a glass plate at 100° C. for 20 minutes, at 150° C. for 10 minutes, heated at 250° C. for 10 minutes, and then at 300° C. for 30 minutes to produce the oligomide. As the result of the imidation, a dark brown powder having an inherent viscosity of 0.1 is obtained.

(2) Preparation of oligomer (II)

A pyromellitic dianhydride solution (10% concentration) is reacted with a 4,4'-diamino-diphenyl ether solution of the same concentration in a molar ratio of pyromellitic dianhydride/4,4'-diamino-diphenyl ether of 100/50, in the same manner described in Example 1, but using diethylene glycol mono-ethyl ether instead of methanol, and adding the alcohol to the diamine solution before reaction, instead of after reaction as in Example 1. As the result of the reaction, oligomer (II) with a solution viscosity of 0.04 poise (at 20° C.), and an inherent viscosity of 0.07 is obtained.

The oligomer (II) so formed is heated as above, and yellow powder having an inherent viscosity of 0.085 is obtained.

(3) Oligoamide-acid composition (mixture)

200 ml. each of the oligomer (I) solution and oligomer (II) solution thus formed are mixed together, and an oligomer composition having a solution viscosity of 0.05 poise (at 20° C.), and an inherent viscosity of 0.07, is obtained. The molar ratio of terminal amino groups to terminal carboxyl groups of the composition is 1.03.

From the composition so formed, polyimide film is produced on a glass plate as in the preceding examples, and polymer with an inherent viscosity of 0.83 is obtained.

EXAMPLES 5–8

Oligomer (I) solution and oligomer (II) solution are prepared as follows, and are mixed together to give oligoamide-acid compositions. Reaction conditions and the results obtained are shown in Tables 1 and 2 below.

(1) Preparation of oligomer (I)

Diamines are dissolved in an organic solvent, and the solutions are cooled to 20° C. Into these solutions, solutions of tetracarboxylic acid dianhydride dissolved in the organic solvent are added with stirring. The resulting mixtures are cooled to 15° C. and stirred for 2 hours.

(2) Preparation of oligomer (II)

Tetracarboxylic acid dianhydrides are added to an organic solvent with heating to give solutions of said acids. Into these solutions, diamines are added at 60° C. Into the resulting mixtures, water is added in an amount sufficient to hydrolyze the terminal anhydride group of the oligomers, and the mixtures are stirred at a temperature above 30° C. for 1 hour.

(3) Amide acid oligomer compositions

The oligomer (I) solution and oligomer (II) solution so prepared are mixed together at room temperature in amounts so that the molar ratio of terminal groups is in the range of from 0.9 to 1.25.

TABLE 1.—REACTION CONDITIONS FOR THE PRODUCTION OF OLIGOS MER COMPOSITION AND PROPERTIES THEREOF

| Example number | 5 | 6 | 7 | 8 |
|---|---|---|---|---|
| Diamine | 2-DM | 2-mP | 2-mP | 2-B |
| Tetracarboxylic acid dianhydride | PMDA | PMDA | PMDA | BTDA |
| Solvent | MNP | DMSO | DMF | DMF |
| Oligomer (I): molar ratio of starting compounds [1] | 100/70 | 100/60 | 100/90 | 100/40 |
| Oligomer (II): molar ratio of starting compound [2] | 70/100 | 60/100 | 90/100 | 40/100 |
| Terminal groups molar ratio [3] | 1.04 | 1.10 | 0.98 | 1.01 |
| Concentration, percent | 20 | 20 | 35 | 25 |
| Viscosity of solution, in poise at 20° C | 1.3 | 0.70 | 3.0 | 0.55 |
| Inherent viscosity | 0.3 | 0.28 | 0.4 | 0.1 |

[1] Molar ratio of diamine/tetracarboxylic acid dianhydride in oligomer (I).
[2] Molar ratio of diamine/tetracarboxylic acid dianhydride in oligomer (II).
[3] Molar ratio of terminal amino/terminal carboxyl in the oligomer composition.

TABLE 2.—CONDITIONS FOR THE PRODUCTION OF FILM AND ITS PROPERTY

| Example Number | 5 | 6 | 7 | 8 |
|---|---|---|---|---|
| Drying condition | In air: 80° C., 30 min | Under reduced pressure: 70° C. 30 min. | In air: 80° C., 20 min | Under air current: 100° C., 10 min. |
| Polycondensation condition | In air: 300° C., 30 min | In air: 300° C., 30 min | In nitrogen: 280° C., 4 hrs | Under air current: 250° C., 30 min.; 350° C., 10 min. |
| State of formed film | Excellent | Excellent | Excellent | Excellent slightly brittle. |
| Viscosity of polyimide [$\eta$ inh.] | 1.4 | 1.4 | 1.4 | 1.4. |

EXAMPLES 9–12

Four oligomer compositions are obtained in a manner similar to Example 2 or 4, using active hydrogen compounds other than water to open the terminal acid anhydride ring of the anhydride terminal oligomers. Reaction conditions and the results obtained are shown in Table 3 and Table 4 as follows:

TABLE 3.—REACTION CONDITIONS FOR THE PRODUCTION OF OLIGOMER COMPOSITION AND PROPERTIES THEREOF

| Example Number | 9 | 10 | 11 | 12 |
|---|---|---|---|---|
| Method of preparation of oligomer [1] | 2 | 4 | 2 | 2 |
| Active hydrogen compound | PA | CHA | β-DMEA | BS |
| Diamine | 2-mP | 2-mP | 2-DX | 2-DE |
| Tetracarboxylic acid dianhydride | PMDA | PMDA | PMDA | PMDA |
| Solvent | DMSO | DMF | [2] DEF/CHCO | DMAC |
| Oligomer (I), molar ratio of starting compounds [3] | 100/60 | 100/90 | 100/80 | 100/85 |
| Oligomer (II), molar ratio of starting compounds [3] | 60/100 | 90/100 | 80/100 | 85/100 |
| Terminal groups, molar ratio [4] | 1.05 | 1.03 | 0.98 | 0.93 |
| Concentration of oligomer composition (percent) | 20 | 35 | 20 | 20 |
| Solution viscosity of oligomer composition in poises at 20° C | 0.9 | 2.7 | 1.2 | 0.21 |
| Inherent viscosity | 0.2 | 0.35 | 0.3 | 0.3 |

[1] Example number, adopted for the preparation of oligomer.
[2] Equals 90/10 (weight).
[3] Molar ratio of diamine/dianhydride.
[4] Molar ratio of terminal amino/terminal carboxyl groups in oligomer composition.

TABLE 4.—CONDITIONS FOR THE PRODUCTION OF POLYIMIDE FILM AND ITS PROPERTY

| Example Number | 9 | 10 | 11 | 12 |
|---|---|---|---|---|
| Drying condition | Under reduced pressure: 70° C., 30 min. | In air: 80° C., 20 min. | In air: 100° C., 20 min. | Under air current: 300° C., 20 min. |
| Polycondensation condition | In air: 300° C., 10 min. | In air: 280° C., 4 hrs. | In air: 250° C., 10 min.; 300° C., 10 min.; 350° C., 10 min. | |
| State of formed film | Excellent | Excellent | Excellent | Excellent |

EXAMPLE 13

(1) Preparation of oligomer (I)

In a 1-liter three necked flask, 24,513 g. of 4,4'-diaminodiphenyl ether and 33,922 g. of 3,4,4'-triamino-diphenyl ether are dissolved in 220 g. of dimethyl acetamide, and into the solution, 51,914 g. of pyromellitic dianhydride in 380.7 g. of dimethyl acetamide is added over a period of 45 sec. The vessel used for the preparation of dianhydride solution is washed with 24.6 g. of dimethyl acetamide, and the wash liquid is added to the reaction mixture. The temperature of the reaction mixture rises up to 48° C. during the reaction. The mixture is stirred for 30 min. and an oligomer solution with a viscosity of 0.50 poise (at 20° C.) with an inherent viscosity of 0.28 is obtained. The oligomer (I) is an oligoamide having terminal amino groups.

(2) Preparation of oligomer (II)

In a 1-liter three necked flask, 83.62 g. of pyromellitic dianhydride is dissolved in 613.2 g. of dimethyl acetamide, and into the solution, 67.24 g. of 4,4'-diamino-diphenyl ether dissolved in 140.3 g. of dimethyl acetamide is added over a period of 60 seconds. The vessel used for the preparation of the diamine solution is washed with 20 g. of dimethyl acetamide and the wash liquid is added to the reaction mixture. The temperature of the reaction mixture rises up to 52° C. during the reaction. 40.7 g. of water is then added to the reaction mixture, and the resulting solution is stirred for 30 min. An oligomer solution is obtained with a viscosity of 0.8 poise (at 20° C.), and an inherent viscosity of 0.31. The oligomer (II) is an oligoamide acid having terminal carboxyl groups.

(3) Oligomer composition

The amount of oligomer (I) solution and oligomer (II) solution obtained above are mixed together, and the solvent is evaporated off from the mixture in a rotary evaporator to give a solution of 32% concentration, having a solution viscosity of 56 poise (at 30° C.) and an inherent viscosity of 0.30 with a molar ratio of terminal amino groups to terminal carboxyl groups of 1.16.

The concentrated solution is spread on a glass plate, heated at 100° C. for 30 min. in a forced draft oven to evaporate most of the solvent from the solution, and then heated at 340° C. for 30 min. under a forced draft. A tough, resilient transparent disk of red brown in color is obtained. The disk has a thickness of 750 m. The polymer is a polyimide having imidazopyrollone units and an inherent viscosity of 1.5.

EXAMPLES 14-22

The procedure described in Example 13 is repeated, and oligomer compositions of this invention are obtained. Upon heating the oligomers produced, excellent films of elevated inherent viscosity are obtained. The results obtained are tabulated in the following table.

TABLE 5.—PROPERTIES OF OLIGOMER COMPOSITION

| Example number | Amines used (mole ratio) | Tetracarboxylic acid dianhydride (mole ratio) | Solvent (weight ratio) | Terminal groups (mole ratio) | $\eta_{inh.}$ | Heating condition [2] environment in— | Properties of film obtained by heating, inh.[3] |
|---|---|---|---|---|---|---|---|
| 14 | Z-DE/Z-pp=80/20 | PMDA/PPDA=60/30 | DMAC/NMP=30/70 | 0.98 | 0.26 | Air | 0.91. |
| 15 | Z-DE/Z-DTE/4-P=45/45/10 | PMDA | DMAC/NMP=30/70 | 1.20 | 0.38 | Nitrogen | Insoluble. |
| 16 | Z-PE/ZPDSO/3-B=70/20/10 | PMDA/NTDA=80/20 | DMAC/NMP=30/70 | 0.99 | 0.27 | do | Do. |
| 17 | Z-BPP/3-BPAD=80/20 | PMDA | DMAC/NMP=30/70 | 1.06 | 0.24 | do | Do. |
| 18 | Z-DE/Z-N=70/30 | BDPEDA | DMAC/NMP=30/70 | 1.00 | 0.39 | Air | 1.33. |
| 19 | Z-DE/ZMB/4-DS=70/20/10 | DPTDA | DMAC/NMP=30/70 | 1.02 | 0.5 | do | Insoluble. |
| 20 | Z-DE/Z-PMA=10/90 | PMDA | DMAC/NMP/SN=30/50/10 | 1.70 | 0.31 | Nitrogen | 0.95. |
| 21 | Z-DE/3-P=90/10 | PSO₂DA | DMAC/NMP/SN=30/50/10 | 1.23 | 0.50 | do | Insoluble. |
| 22 | Z-DE/4-N=90/10 | BTDA | DMAC/NMP/SN=30/50/10 | 0.92 | 0.33 | do | Do. |

[1] Diluted with DMAc, 0.5 g./100 ml. of concentration at 30° C.
[2] 100° C.×20 min., 300° C.-350° C.×10 min.
[3] In fuming nitric acid 0.5 g./100 ml. of concentration, at 30° C.

EXAMPLE 23

(1) Preparation of oligomer (I)

142,812 g. of 4,4'-diamino-diphenyl ether and 59,586 g. of 3,4,4'-triamino-diphenyl ether are dissolved in a mixture of 217.5 g. of dimethyl acetamide, 645.6 g. of N-methyl-2-pyrrolidone and 21.75 g. of water, at room temperature, and to the solution so formed, 181,395 g. of pyromellitic dianhydride dissolved in dimethyl acetamide is added, with stirring. The vessel used for the preparation of the dianhydride solution is washed with 75 g. of dimethyl acetamide, and the wash liquid is incorporated into the reaction mixture. The whole mixture is stirred for 40 min. at 15–20° C., and an oligoamide acid solution having a viscosity of 0.38 poise (at 20° C.) and an inherent viscosity of 0.23 is obtained.

(2) Preparation of oligomer (II)

215,946 g. of pyromellitic dianhydride is dissolved in 1445.1 g. of dimethylacetamide, and to the solution 171,282 g. of 4,4'-diamino-diphenyl ether dissolved in 673.5 g. of N-methyl-2-pyrrolidone containing 21.93 g. of water is added, with stirring. The vessel used in the preparation of the diamine solution is washed with 75.6 g. of dimethyl acetamide, and the wash liquid is incorporated into the reaction mixture. The whole mixture is stirred for 40 min. and an oligoamide acid solution having a viscosity of 0.62 poise (at 20° C.) and an inherent viscosity of 0.28 is obtained.

(3) Oligomer composition

The oligomer (I) solution and the oligomer (II) solution obtained are mixed in a ratio of 100/114 to give a mixture with a viscosity of 0.5 poise. The mixture is then concentrated under reduced pressure, and again is diluted with a mixed solvent of N-methyl-2-pyrrolidone and solvent naphtha. The resulting oligomer mixture solution, dissolved in a 60/30/10 mixture by weight of N-methyl-2-pyrrolidone/dimethyl acetamide/solvent naphtha, has a viscosity of 54 poise (at 30° C.), and an inherent viscosity of 0.25, a concentration of 32%, and a ratio of terminal amino groups to terminal carboxyl groups of 1.04.

Said solution is applied to coat a surface of copper wire at 1.00 mm. in diameter as a wire enamel, and the coated copper wire is baked in a baking oven having an effective oven length of 4.5 m., at baking conditions used for the preparation of multipurpose enamel wire, i.e., at a baking speed of 9 m./min., and at an oven temperature of 375°–420° C. (at the middle of oven). The coating and baking procedure is repeated eight times to produce an enamel wire of excellent appearance with an 80µ film thickness (increase in diameter).

Commercial wire enamel prepared from 4,4'-diaminodiphenyl ether and pyromellitic dianhydride, of 16.5% concentration, a solution viscosity of 60 poise (at 30° C.) and with an inherent viscosity of 0.8, is used to produce enamel wire at the same conditions as above. Baking is repeated 12 times, and coated film with a thickness of 0 is obtained. At a baking speed of more than 7 m./min., bubbles appeared in the wire enamel, producing an enamel wire with a poor appearance.

The enamel wire produced with the composition of this invention has an excellent abrasion resistance, chemical resistance and water vapor resistance when compared with the enamel wire produced from commercial high molecular weight enamel. The other properties of the enamel wire produced with the composition of this invention are almost the same as those of enamel wire produced from commercial wire enamel.

The following are typical properties of an enamel wire coated with the composition of this invention.
Flexibility: [1]
Abrasion resistance [2]—45–55
Dielectric strength—12–15 kv.
Chemical resistance: [3]
  Normal surface hardness—4–5H
  5% sodium hydroxide—3–4H
  10% sodium hydroxide—B
  Sulfuric acid—4H
  5% hydrochloric acid—4H
Solvent resistance: [3]
  Ethanol—4–5H
  Ethanol-toluene—4–5H
  Benzene—4–5H
  Naphtha—4–5H
  Dimethyl acetamide—4–5H
  $\eta_{inh}$—1.4

[1] Mandrel diameter on which wire could be wrapped:
  (1) after 25% slow elongation—1X
  (2) after aging wire at 300° C. for 24 hrs.—1X
[2] Repeated scrape (strokes), weight 600 g.
[3] Pencil hardness: Immerse in various reagents for 24 hrs. at room temperature.

EXAMPLES 24–29

The procedures described in Example 13 are repeated, and oligomer compositions of this invention are obtained. Upon heating the oligomers so produced, excellent films of elevated inherent viscosity are obtained. Reaction conditions and the results obtained are shown in Table 6, Table 7, and Table 8 below.

TABLE 6.—PREPARATION OF OLIGOMER (I)

| Lot No. | Amines | | | | | | Tetracarboxylic acid | | | Product | | |
|---|---|---|---|---|---|---|---|---|---|---|---|---|
| | Diamine | Amount (g.) | Triamine | Amount (g.) | Tetramine | Amount (g.) | Solvent[1] | Dianhydride | Amount (g.) | Solvent | Oligomer solution Total concentration percent | $\eta_{inh}$ | Formed product after heating[2] |

| Lot No. | Diamine | Amount (g.) | Triamine | Amount (g.) | Tetramine | Amount (g.) | Solvent[1] | Dianhydride | Amount (g.) | Solvent | Total conc. % | $\eta_{inh}$ | Formed product after heating[2] |
|---|---|---|---|---|---|---|---|---|---|---|---|---|---|
| I-1 | 2-DO | 44.69 | 3-DO | 18.68 | | | Water (10) / DMA (90) | PMDA | 57.47 | | 20 | 0.24 | Black powder. |
| I-2 | 2-DO | 8.81 | 3-DO | 12.05 | | | DMAC (50) / NMP (50) | PMDA | 18.54 | DMAC | 15 | 0.26 | Do. |
| I-3 | 2-DO | 1.32 | 3-DO | 20.10 | | | DMF | PMDA | 17.45 | NMP | 15 | 0.20 | Do. |
| I-4 | | | 3-DM | 21.33 | | | DMAC (95) / Water (5) | PMDA | 17.45 | DMAC / NMP | 15 | 0.19 | Do. |
| I-5 | 2-DM | 7.05 | | | 4-DO | 10.00 | DMAC | BTDA | 20.37 | DMSO | 15 | 0.23 | Do. |
| I-6 | | | | | 4-DM | 18.04 | DMAC (50) / THF (50) | BDPEDA | 19.61 | HMPA | 15 | 0.21 | Do. |

See footnotes at end of Table 7.

TABLE 7.—PREPARATION OF OLIGOMER (II)

| Lot No. | Tetracarboxylic acid | | | Diamine | Amount (g.) | Solvent[1] | Product Oligomer solution | | | |
|---|---|---|---|---|---|---|---|---|---|---|
| | Dianhydride | Amount (g.) | Solvent | | | | Total conc. (percent) | [3] | $\eta_{inh}$ | Formed product after heating |
| II-1 | PMDA | 34.90 | DMAC | 2-DO | 27.23 | DNAC (95) / Water (5) | 20 | DEG 5 | 0.20 | Brownish yellow powder. |
| II-2 | BETC | 64.44 | DMAC | 2-mP | 18.38 | | 25 | EtOH 10 | 0.25 | Do. |
| II-3 | PMDA | 61.95 | DEF | 2-DM | 47.86 | NMP | 20 | CDA 3 | 0.23 | Do. |

[1] The numbers in parentheses signify the proportion of solvent used expressed in precent by weight.
[2] Product formed by spreading the oligomer on a glass plate and heating the oligomer at 300° C. for 30 min. in a dryer.
[3] Amount of added active hydrogen compound.

TABLE 8

| Example Number | Oligomer (I) Number | Amount (g.) | Oligomer (II) Number | Amount (g.) | Molar ratio of terminal groups of composition | Composition (after concentration) | | State of formed product[2] |
|---|---|---|---|---|---|---|---|---|
| | | | | | | Concentration (percent) | Poise (30%) | |
| 15 | I-1 | 200 | II-2 | 150 | 1.13 | 33 | 50 | Flexible and tough film. |
| 16 | I-2 | 200 | II-2 | 130 | 0.97 | 33 | 50 | Do. |
| 17 | I-3 | 200 | II-3 | 166 | 1.19 | 40 | 1000 | Do. |
| 18 | I-4 | 200 | II-3 | 175 | 1.14 | 33.5 | 50 | Do. |
| 19 | I-5 | 200 | II-1 | 146 | 1.12 | 34.5 | 46 | Do. |
| 20 | I-6 | 200 | II-2 | 138 | 1.18 | 34 | 60 | Do. |

[1] Molar ratio of terminal amino group/terminal carboxyl group of the compostion.
[2] State of film obtained by spreading the composition on a glass plate, drying the composition at 100° C. for 20 minutes, and heating the dried composition at 350° C. for 30 minutes.

EXAMPLE 30

(1) Preparation of oligomer (I)

Into a solution of 215,257 g. of 3,3',4'-triamino-diphenyl ether dissolved in 868.96 g. of dimethyl acetamide and 20.0 g. of water, a solution of 198.493 g. of pyromellitic acid dianhydride dissolved in 1,455.62 g. of dimethyl acetamide is added, with stirring, and the mixture is then stirred fr 30 min. at a temperature from 20° to 30° C. to give relatively viscous solution. The solution obtained is diluted, and the inherent viscosity of the solution is determined to be 0.35.

(2) Preparation of oligomer (II)

Into a solution of 67.618 g. of pyromellitic dianhydride dissolved in 510.43 of dimethyl acetamide, 44,053 g. of 4,4'-diamino diphenyl ether is added to react therewith. Then, 9 g. of water is added to the mixture. The resulting mixture is maintained at 20° C. for 30 min. A part of the solution obtained is diluted with dimethyl acetamide into a solution of 0.5 g./100 ml. concentration with an inherent viscosity of 0.11. The reaction solution is spread on a glass plate, and is heated at 300° C. for 30 min. No film is obtained, only a yellow opaque powder.

(3) Oligomer composition

The oligomer (II) solution is mixed with the oligomer (I) solution in a proportion of oligomer (II)/oligomer (I) of 2.29/10.00, and the mixture is concentrated under reduced pressure to give a solution with a solution viscosity of 50 poise (at 30° C.) of an inherent viscosity of 0.29.

The mole ratio of terminal amino groups to terminal carboxy groups of the composition is 1.00.

The composition so obtained is spread on a glass plate, heated at 100° C. for 20 minutes and at 360° C. for an additional 20 minutes to give a tough, polyimide film, having a $\eta_{inh}$ of 1.3.

EXAMPLE 31

(1) Preparation of oligomer (I)

182,222 g. of 4,4'-diamino diphenyl ether and 19,373 g. of 3,3'4'-triamino diphenyl ether are dissolved in a mixture of 837.9 g. of dimethyl acetamide and 20 g. of water, and into the solution a slurry of 185,405 g. of pyromellitic dianhydride suspended in 650 g. of dimethyl acetamide is added. The vessel used for the preparation of the slurry is washed with 40 g. of dimethyl acetamide, and the wash liquid is incorporated into the reaction mixture.

The resulting mixture is stirred at room temperature for 30 minutes. The oligomer obtained has an inherent viscosity of 0.30.

(2) Preparation of oligomer (II)

218,124 g. of pyromellitic dianhydride is dissolved in 1,817.7 g. of dimethyl acetamide, and into this solution a slurry of 170,206 g. of 4,4'-diamino diphenyl ether suspended in 300.84 g. of dimethyl acetamide and 10 g. of water is added. The vessel used for the preparation of the slurry is washed with dimethyl acetamide, and the wash liquid is incorporated into the reaction mixture. An oligomer with an inherent viscosity of 0.27 is obtained.

(3) Oligomer composition

Oligomers (I) and (II) thus obtained are mixed together, and the mixture is concentrated under reduced pressure to a solution of 50 poise (at 30° C.), and a concentration of 32.4%. The solution has an inherent viscosity of 0.28.

The composition so formed is coated on copper wire 1 mm. in diameter, baked at 100° C. for 10 seconds, and then at 360° C. for 10 seconds.

This coating procedure is repeated 5 times, and enamel wire having a coated layer of 40μ thickness is produced.

The enamel wire thus formed is tested for abrasion resistance with a 600 g. weight, and the abrasion resistance was found to be 89 strokes.

For comparison purposes, enamel wire coated with the commercial aromatic polyimide wire enamel described in Example 23 was tested, and the results showed that the abrasion resistance of the commercial wire was 24 strokes.

While the invention has been particularly shown and described with reference to a preferred embodiment thereof, it will be understood by those skilled in the art that various changes in form and details may be made therein without departing from the spirit and scope of the invention.

What is claimed is:

1. A process for preparing a heat resisting polyimide which comprises heating an amide-acid oligomer composition at a temperature above 200° C., said amide-acid oligomer composition obtained by mixing an oligomer (I) obtained by the reaction of tetracarboxylic dianhydride represented by the following general formula:

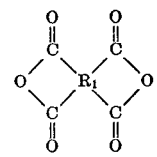

wherein $R_1$ is a tetravalent aromatic radical selected from the group consisting of

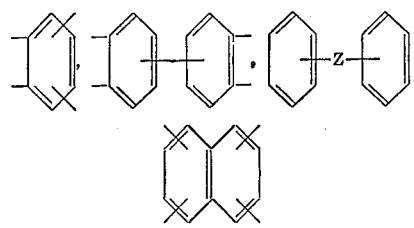

and

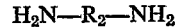

with from 3 to about 60 mole percent excess of diamine represented by the following general formula:

$$H_2N—R_2—NH_2$$

wherein $R_2$ is a divalent aromatic radical selected from the group consisting of

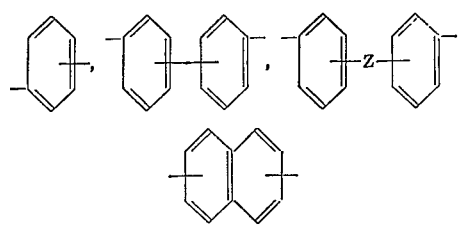

and wherein Z is a divalent radical selected from the group consisting of an alkylene radical with from 1 to 3 carbon atoms, —O—, —S—, —SO$_2$—, —CO—, and —CONR'—, said R' being selected from the group consisting of hydrogen, an alkyl radical having from 1 to 4 carbon atoms and a phenyl radical and an oligomer (II) obtained by the reaction of from about 3 to about 60 mole percent excess of said tetracarboxylic acid dianhydride with said diamine, said oligomer (II) being reacted with a compound selected from the class consisting of water, aliphatic monohydroxy alcohols having from 1 to 18 carbon atoms and aliphatic monothio alcohols having from 1 to 6 carbon atoms so as to open the ring of the terminal acid anhydride group of said oligomer, wherein the proportion of oligomer (I) to oligomer (II) being determined by the following formula:

$$m_1/1.25m_2 \leq W \leq m_1/0.9m_2$$

where $m_1$ is the mol number difference of the amine component and the tetracarboxylic acid cimponent contained in a unit weight of the oligomer (I); $m_2$ is the mol number difference of the amine component and tetracarboxylic acid component contained in a unit weight of the oligomer (II), and W is the weight ratio of oligomer (I) to oligomer (II) mixed.

2. The process as claimed in claim 1, wherein in the preparation of oligomer (I) from about 5 to about 60 mole percent of the diamine is replaced with at least one compound selected from the group consisting of triamines and tetramines, and mixtures thereof, wherein said triamines and tetramines are represented, respectively, by the following general formulae:

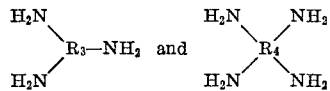

wherein $R_3$ is selected from the group consisting of

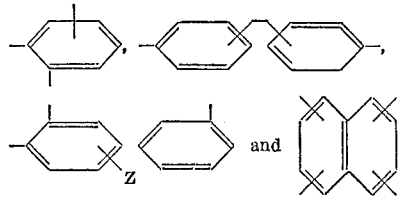

and $R_4$ is selected from the group consisting of

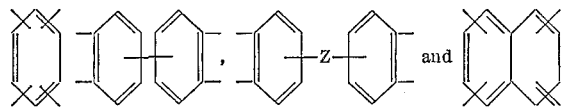

wherein Z is a divalent radical selected from the group consisting of an alkylene radical with from 1 to 3 carbon atoms, —O—, —S—, —SO$_2$—, —CO—, and —CONR'—, said R' being selected form the group consisting of hydrogen, an alkyl radical having from 1 to 4 carbon atoms and a phenyl radical.

3. A process for preparing polyimide shaped articles which comprises coating an amide-acid oligomer composition onto a substrate and then heating the coated substrate at a temperature above 200° C., said amide acid oligomer composition being obtained by mixing an oligomer (I) obtained by the reaction of tetracarboxylic dianhydride represented by the following general formula:

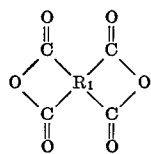

wherein $R_1$ is a tetravalent aromatic radical selected from the group consisting of

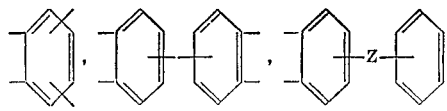

and

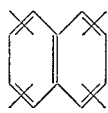

with from 3 to about 60 mole percent excess of diamine represented by the following general formula:

$$H_2N-R_2-NH_2$$

wherein $R_2$ is a divalent aromatic radical selected from the group consisting of

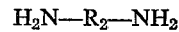

and

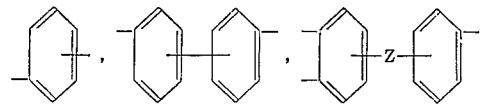

and wherein Z is a divalent radical selected from the group consisting of an alkylene radical with from 1 to 3 carbon atoms, —O—, —S—, —SO$_2$—, —CO—, and —CONR'—, said R' being selected form the group consisting of hydrogen, an alkyl radical having from 1 to 4 carbon atoms and a phenyl radical and an oligomer (II) obtained by the reaction of from about 3 to about 60 mole percent excess of said tetracarboxylic acid dianhydride with said diamine, said oligomer (II) being reacted with a compound selected from the class consisting of water, aliphatic monohydroxy alcohols having from 1 to 18 carbon atoms and aliphatic monothio alcohols having from 1 to 6 carbon atoms so as to open the ring of the terminal acid anhydride group of said oligomer, wehrein the proportion of oligomer (I) to oligomer (II) being determined by the following formula:

$$m_1/1.25m_2 \leq W \leq m_1/0.9m_2$$

where $m_1$ is the mol number difference of the amine component and the tetracarboxylic acid component contained in a unit weight of the oligomer (I); $m_2$ is the mol number difference of the amine component and tetracarboxylic acid component contained in a unit weight of the oligomer (II), and W is the weight ratio of oligomer (I) to oligomer (II) mixed.

4. The process as claimed in claim 3, wherein in the preparation of oligomer (I) from about 5 to about 60 mole percent of the diamine is replaced with at least one compound selected from the group consisting of triamines and tetramines, and mixtures thereof, wherein said triamines and tetramines are represented, respectively, by the following general formulae:

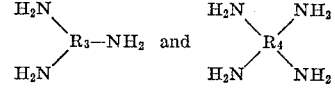

wherein $R_3$ is selected from the group consisting of

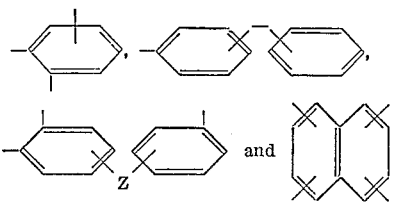

and $R_4$ is selected from the group consisting of

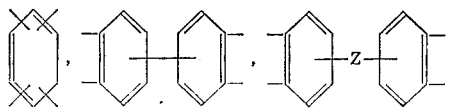

and

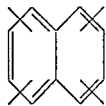

wherein Z is a divalent radical selected from the group consisting of an alkylene radical with from 1 to 3 carbon atoms, —O—, —S—, —SO$_2$—, —CO—, and —CONR'—, said R' being selected from the group consisting of hydrogen, an alkyl radical having from 1 to 4 carbon atoms and a phenyl radical.

References Cited

UNITED STATES PATENTS 3,440,197    4/1969    Boldebuck et al. ____ 260—29.2
3,459,706    8/1969    Schweiter _____ 260—47

WILLIAM H. SHORT, Primary Examiner
L. L. LEE, Assistant Examiner

U.S. Cl. X.R.

260—65, 78 TF; 117—161